Nov. 23, 1926. 1,608,006

J. H. SHAPLEIGH

PROCESS OF ABSORBING SULPHUR TRIOXIDE FROM GASES CONTAINING SAME

Filed April 22, 1925

WITNESS:

INVENTOR
James H. Shapleigh
BY
Brown and Harding
ATTORNEYS.

Patented Nov. 23, 1926.

1,608,006

UNITED STATES PATENT OFFICE.

JAMES H. SHAPLEIGH, OF DOVER, NEW JERSEY, ASSIGNOR TO HERCULES POWDER COMPANY, OF WILMINGTON, DELAWARE, A CORPORATION OF DELAWARE.

PROCESS OF ABSORBING SULPHUR TRIOXIDE FROM GASES CONTAINING SAME.

Application filed April 22, 1925. Serial No. 24,950.

My invention relates to the absorption of $SO_3$ from gases containing $SO_3$ by spraying sulphuric acid on the gases. Such processes are well known. The object of my invention is to substantially improve this process by effecting the production of multiple strengths of acid products in a single unpacked treating chamber, by eliminating all resistance to flow of gas except that produced by the sprayed absorbing acid, by spraying sulphuric acid on the gases cross-current to the direction of gas flow, and by other features, with the object in view of simplifying the process, increasing its efficiency, and reducing the cost of the plant and the expense of operation.

Figure 1:
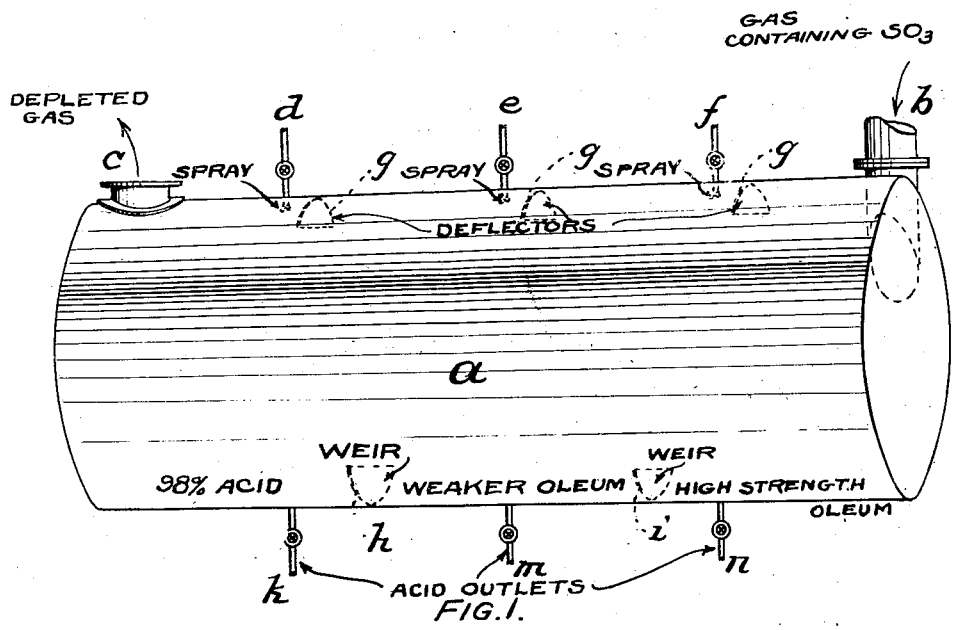
Figure 2:
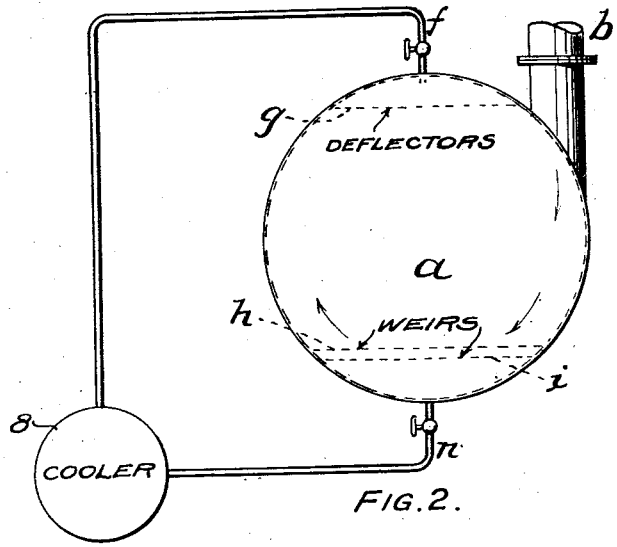

In order to practice the process with the utmost efficiency and economy, I have designed the apparatus shown in the accompanying drawings, in which Fig. 1 is a perspective view, and Fig. 2 an end view, of the absorption chamber and parts appurtenant thereto.

Before describing the process, I will describe the structure of the apparatus shown in the drawings, in which—

The tunnel $a$ is in the form of a cylinder having a horizontal axis and is provided at one end with a gas inlet $b$ and at the other end with a gas outlet $c$. The gas inlet is so positioned as to admit the gas in a direction tangential to the wall of the tunnel. Spray lines $d$, $e$ and $f$ enter the top of the tunnel at different points along its length. Positioned at the top of the tunnel back of each spray line is a gas deflector $g$. Arranged along the tunnel bottom are partitions or weirs $h$ and $i$, there being one weir between spray lines $d$ and $e$, and another weir between spray lines $e$ and $f$; thus forming spray compartments and acid-collecting basins corresponding in number to the spray lines. $k$, $m$ and $n$ are valved outlet pipes for acid products.

If the gas enters the tunnel in a tangential direction, as is preferable, a circular or spiral motion will be imparted to the gas in transit, thus increasing the length of path traversed by the gas. The deflectors $g$ further assure this effect and also force the gas down into the spray. The circular flow of gas also has the advantage of causing the gas to impinge against the spray at an oblique angle thereto, as distinguished from an approximate right angle of contact, such as would be produced if the flow of gas were directly horizontal, which would tend to retard the spreading of the spray. My process is, however, workable with a direct horizontal flow of gas. Of course, in either case, the general direction of flow of gas is horizontal, although, preferably, as stated, the gas effects this horizontal transit by taking a series of circular paths that progressively recede from the inlet and approach the discharge.

Above each spray compartment may be a single spray or a multiple spray, and if more than one spray be used they may be at the same or different angles.

The tunnel is preferably of steel construction. It may be brick-lined, although this is probably unnecessary.

There may be any number, more than two, of acid-collecting basins and spray compartments. Preferably, there are three or more.

The operation is as follows: The contact gas, which may contain (say) 12% $SO_3$ in the usual processes, or as high as 80% $SO_3$ in special processes, enters the tunnel $a$ through inlet $b$. When it encounters the first acid spray, it has a high vapor pressure and permits the making of high strength oleum. As the gas progresses through the tunnel, its vapor pressure becomes progressively less until complete absorption has taken place. The depleted gas leaves exit $c$ and is exhausted through a spray catcher to the atmosphere. Due to the progressively decreasing vapor pressure, the absorption of $SO_3$ in the second spray chamber is such as to produce oleum of intermediate strength, while the absorption of $SO_3$ in the third spray chamber is such as to produce 98% acid. Of course, the strength of the acid made in the several compartments will depend on a variety of factors, such as the percentage of $SO_3$ in the incoming gas, the amount and strength of the spray acid, the volume and rate of flow of the gas, the degree of contact between the sprays and the gas, the dimensions of the tunnel, and the number of spray chambers.

The acid that is withdrawn from each acid basin may be cooled, a cooler $o$ being diagrammatically shown in Fig. 2, and then returned to the corresponding spray chamber, thus gradually increasing the strength of the acid product in the basin.

It is desirable to establish a movement of the acid from one basin to another counter-current to the general direction of flow of gas. I prefer to make the several weirs of progressively increasing height. In the drawings, for example, weir $h$ is higher than weir $i$. While this flow of acid is opposite to the general direction of flow of the gas, it will be understood that the sprays are relied upon to effect the absorption, and that the acid from the sprays is cross-current to the direction of gas flow.

It will be observed that all the gas with which any single droplet of sprayed acid contacts is at the same $SO_3$ vapor pressure. In most processes, the absorbing acid moves in the direction of the flow of the gas, or counter-current to the flow of gas, as in vertical absorption towers; and therefore any single droplet of absorbing acid contacts with gases of different $SO_3$ vapor pressures. In my process, while the $SO_3$ vapor pressure progressively diminishes, the gas at different $SO_3$ vapor pressures contacts with different droplets of absorbing acid.

A substantial advantage of my improved process is that the movement of the gas through the tunnel is wholly unobstructed; that is, the tunnel is not packed, as in the usual tower, and it is impossible for the gas passage to become blocked. Nevertheless, in a single absorption chamber or tunnel (the division into spray compartments being nominal rather than actual), acids of multiple strengths are produced, and are separately collected. The strength of each acid except the initially strongest is built up by causing the relatively weaker acid to absorb more $SO_3$, and such strengthened acid is automatically transferred to the body of initially stronger acid, which acid, in turn, as its strength builds up, is automatically transferred to the body of the initially strongest acid.

The construction is very simple, not only by reason of its unpacked interior, but also because of the absence of the conduit pipes and nozzles that would be required to transfer gas from one absorption chamber to another, as in a series of towers. There is therefore a substantial saving in cost of construction and in power.

Having now fully described my invention, what I claim and desire to protect by Letters Patent is:

1. The process of absorbing $SO_3$ from contact gases which comprises establishing a substantially unobstructed flow of such gases through a single horizontally extending confined space, spraying sulphuric acid on the flowing gases cross-current to the gas flow and at a number of points along the path of flow, producing thereby a progressive reduction in $SO_3$ vapor pressure at successive points of absorption with continuous production of acid products of progressively diminishing strength and collecting within said space separate bodies of the acid products of the several acid sprays.

2. The process of absorbing $SO_3$ from contact gases which comprises establishing a substantially unobstructed flow of such gases through a single horizontally extending confined space, spraying sulphuric acid on the flowing gases cross-current to the gas flow and at a number of points along the path of flow, and separately collecting the acid products of the several acid sprays.

3. The process of absorbing $SO_3$ from contact gases which comprises establishing a substantially unobstructed flow of such gases through a single horizontally extending confined space, spraying sulphuric acid on the flowing gases cross-current to the gas flow and at a number of points along the path of flow, collecting within said space separate bodies of the acid products of the several acid sprays, and establishing a flow of the acid products from one body of acid product to another counter-current to the general direction of gas flow.

4. The process of absorbing $SO_3$ from contact gases which comprises establishing a substantially unobstructed flow of gases circularly around and along a laterally extending axis, and spraying sulphuric acid on the flowing gases cross-current to the gas flow and at a number of points along the path of flow.

5. The process of asborbing $SO_3$ from contact gases which comprises establishing a substantially unobstructed flow of such gases through a single horizontally extending confined space, spraying sulphuric acid on the flowing gases cross-current to the gas flow and at a number of points along the path of flow, collecting within said space separate bodies of the acid products of the several acid sprays, withdrawing acid from one or more of said bodies and utilizing such acid to maintain the spray on the flowing gases and thereby gradually increase the strength of the acid in said body or bodies, and establishing a flow of the acid products from one body of acid product to another counter-current to the general direction of gas flow.

In testimony of which invention, I have hereunto set my hand, at Kenvil, N. J., on this ninth day of April, 1925.

JAMES H. SHAPLEIGH.